US007487010B2

(12) United States Patent
Simmons

(10) Patent No.: US 7,487,010 B2
(45) Date of Patent: Feb. 3, 2009

(54) FACILITATING VENDING OF CUSTOMER-CONFIGURED PIZZA PREPARATION KITS

(76) Inventor: David Odell Simmons, 7637 Parkview Cir., Austin, TX (US) 78731

( * ) Notice: Subject to any disclaimer, the term of this patent is extended or adjusted under 35 U.S.C. 154(b) by 0 days.

(21) Appl. No.: 11/827,659

(22) Filed: Jul. 12, 2007

(65) Prior Publication Data

US 2008/0015737 A1 Jan. 17, 2008

Related U.S. Application Data

(62) Division of application No. 10/751,143, filed on Jan. 2, 2004, now Pat. No. 7,266,423.

(51) Int. Cl.
*G06F 17/00* (2006.01)

(52) U.S. Cl. ........................ 700/233; 700/242; 700/231

(58) Field of Classification Search .................. 700/233
See application file for complete search history.

(56) References Cited

U.S. PATENT DOCUMENTS 5,097,986 A 3/1992 Domberg et al.
5,121,677 A * 6/1992 Le Claire et al. ....... 221/150 HC
5,210,387 A 5/1993 Smith et al.
5,236,103 A 8/1993 Picken et al.
5,309,824 A 5/1994 Gromgoole et al.
5,921,170 A * 7/1999 Khatchadourian et al. .... 99/349
5,997,924 A 12/1999 Olander, Jr. et al.
6,083,550 A 7/2000 Cochran et al.
6,186,358 B1 2/2001 Peteraf
6,526,874 B1 3/2003 Khatchadourian et al.
6,801,228 B2 10/2004 Kargman
2004/0009266 A1 * 1/2004 Violi et al. .................... 426/94

OTHER PUBLICATIONS

Joe Corbi's Pizza, Joecorbi.com.*
Joe Corbi's Pizza, Joe Corbi.com (Feb. 25, 2008).*
Vending Machine Serves Up Pizza,[retrieved Sep. 9, 2003], retrieved from Internet, URL:www.turnto10.com/consumerunit/2413913/details.html.
A New Slice Of The Pie,[retrieved Sep. 9, 2003], retrieved from Internet, url: www.wonderpizzausa.com/mediacoverage/sothcoast-todayarticle8-03.htm.

* cited by examiner

*Primary Examiner*—Gene Crawford
*Assistant Examiner*—Timothy R Waggoner

(57) ABSTRACT

A vending machine comprises a first product dispensing unit configured for dispensing packaged pizza crust product, a second product dispensing unit configured for dispensing packaged pizza topping product, and an information processing apparatus coupled to the first product dispensing unit and the second dispensing unit. The information processing apparatus is configured for facilitating input and processing of a customer-configured pizza preparation kit order. The first product dispensing unit is a frozen product dispensing unit configured for enabling different types of packaged pizza crust product to be selectively dispensed. The second product dispensing unit is a refrigerated product dispensing unit configured for enabling different types of packaged pizza topping product to be selectively dispensed. The information processing apparatus includes an user interface arrangement, an order processing arrangement and a kit component management arrangement.

20 Claims, 11 Drawing Sheets

FACILITATING VENDING OF CUSTOMER-CONFIGURED PIZZA PREPARATION KITS

CROSS REFERENCE TO RELATED APPLICATIONS

This application is a divisional application of United States Patent Application having Ser. No. 10/751,143 filed Jan. 2, 2004 now U.S. Pat. No. 7,266,423 entitled "Machine And Method Configured For Vending Customer-Configured Pizza Preparation Kits", having a common applicant herewith.

FIELD OF THE DISCLOSURE

The disclosures herein relate generally to vending machines and more particularly to machines, methods and packages configured for enabling vending customer-configured pizza products.

BACKGROUND OF THE DISCLOSURE

Pizza is arguably one of the most popular types of foods worldwide. It is relatively inexpensive to make or buy, can be baked relatively quickly and can be prepared with seemingly infinite combinations and types of toppings and crusts. Perhaps, it is this combination of attributes that makes pizza such a popular type of food.

Various methods and machines configured for vending ready-to-eat pizza are known (i.e., ready-to-eat pizza vending machines). Ready-to-eat pizza vending machines provide a convenient means for ordering a custom ready-to-eat pizza. Similar to ordering a pizza for delivery, a ready-to-eat pizza vending machine serves a pizza intended to be eaten within a relatively short time from when the pizza is baked. In some embodiments, ready-to-eat pizza vending machines serve customer-configured ready-to-eat pizzas. In other embodiments, ready-to-eat pizza vending machines serve pre-configured ready-to-eat pizzas.

A limitation of ready-to-eat pizza vending machines and pizza delivery is degradation of the fresh-baked appeal of the pizza as the elapsed time between preparation of the pizza and eating the pizza increases. For delivered pizza, delays in delivery can result in the pizza dropping below a preferred and/or desired serving temperature. Similarly, for pizza vended from a ready-to-eat pizza vending machine, travel from a vending location (e.g., a convenience store) to a place where the pizza is eaten (e.g., a person's house) can result in the pizza dropping below a preferred and/or desired serving temperature. In either instance, at least a portion of the appeal of ordering the pizza is diminished.

Frozen ready-to-bake pizzas (e.g., bought at a grocery store, convenience store, etc;) can be baked at a person's convenience at the location where the pizza will be eaten. Thus, the issue of delay in eating the pizza once baked is virtually eliminated. However, frozen ready-to-bake pizzas are limited in their available crust/topping configurations. As freezer shelf space at grocery and convenience stores is limited and valuable, only a limited selection of crust/topping configurations is available for any particular frozen ready-to-eat pizza manufacturer. Furthermore, a pre-configured combination pizza (e.g., a supreme combination pizza) may include desired topping for one person and the same combination of toppings may be undesirable to another person. Combined with various available crust styles (e.g., thin, hand tossed, bake-to-rise, etc.), the likeliness of offering a pizza that approaches a person's preferred pizza configuration is remote. Most people pick a frozen ready-to-back pizza that is the best available option rather than a preferred configuration.

Therefore, machines, methods and packages configured for enabling vending a customer-configured pizza preparation kit would be useful.

DETAILED DESCRIPTION

The disclosures made herein pertain to various aspects of vending machines configured for dispensing customer-configured pizza preparation kits (i.e., pizza preparation kit vending machines). Such pizza preparation kit vending machines are configured for allowing a customer to facilitate creation of a kit for preparing a pizza having a customer-configured crust and topping configuration (i.e., a pizza preparation kit). Such pizza preparation kits may be cooked at a time and location convenient to the customer. Pizza preparation kit vending machines in accordance with embodiments of the disclosures made herein may be located at various point-of-purchase locations. Examples of such point-of-purchase locations include dormitory vending areas, gas-station convenience stores, neighborhood convenience stores, grocery stores, movie rental stores, etc.

Pizza preparation kit vending machines in accordance with embodiments of the disclosures made herein offer a number of advantages over known methods and machines configured for vending ready-to-eat pizza (i.e., ready-to-eat pizza vending machines) and over frozen ready-to-bake pizzas. Pizzas derived from pizza preparation kit vending machines as disclosed herein can be baked at a person's convenience and at the location where the pizza will be eaten, thus eliminating delays in eating the pizza once baked. Available crust/topping configurations of pizzas derived from pizza preparation kit vending machines as disclosed herein are much less limited than frozen ready-to-eat pizzas. Essentially, the number of possible crust/topping configurations is limited primarily by the number of different types of crust and topping product capable of being simultaneously dispended (i.e., relative to a single order) by a pizza preparation kit vending machine in accordance with embodiments of the disclosures made herein. Furthermore, a pizza preparation kit vending machine in accordance with embodiments of the disclosures made herein occupies a relatively small amount of floor space with respect to the number of crust/topping configurations of pizzas derived from such a pizza preparation kit vending machine.

Figure 1:
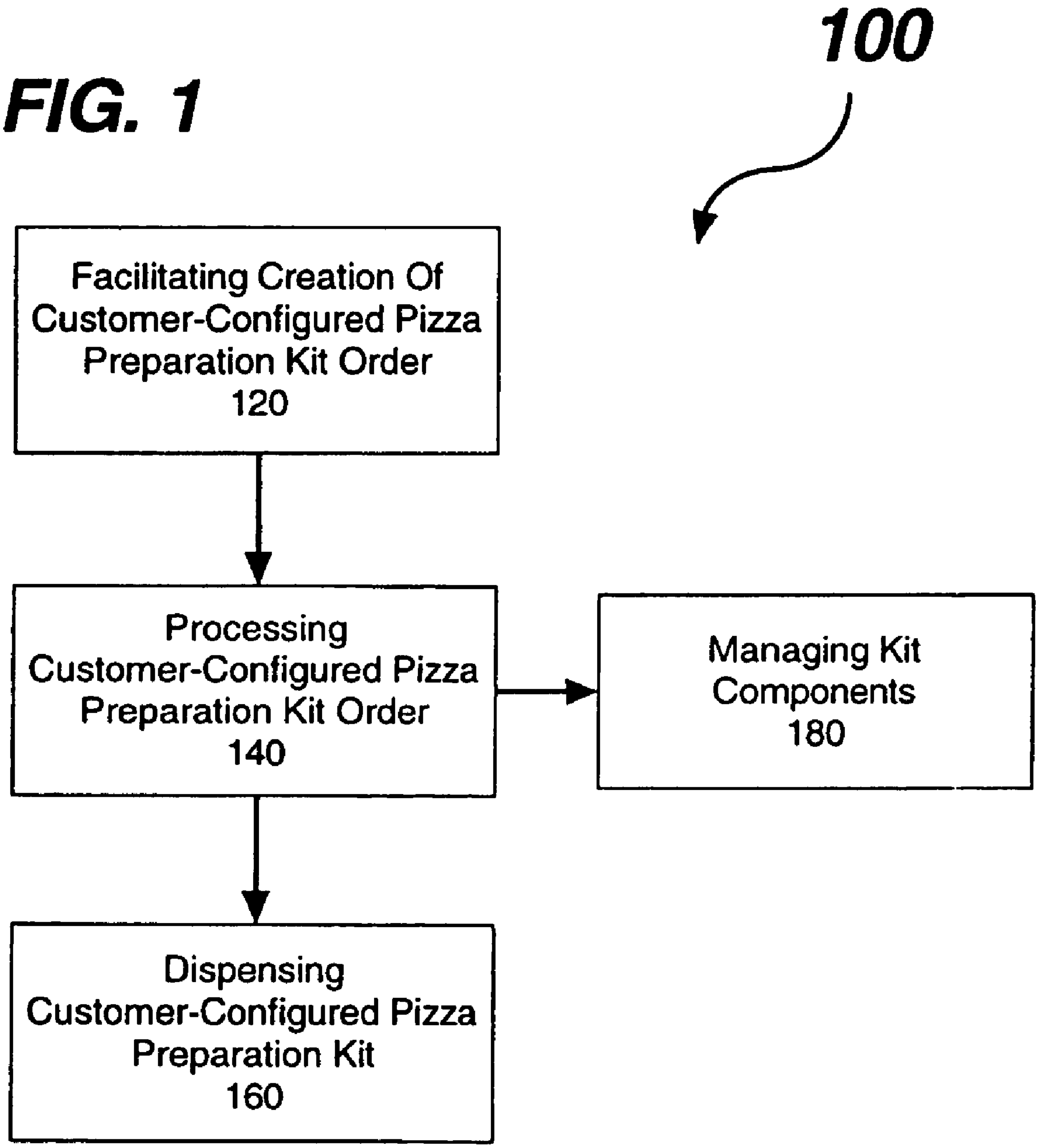
FIG. 1 depicts a method configured for vending a customer-configured pizza preparation kit in accordance with an embodiment of the disclosures made herein.

Turning now to specific figures, FIG. 1 depicts a method 100 configured for vending a customer-configured pizza preparation kit in accordance with an embodiment of the disclosures made herein. A pizza preparation kit vending machine in accordance with embodiments of the disclosures made herein is configured for carrying out the method 100. It is contemplated herein that embodiments of pizza preparation kit vending machines configured for carrying out the method 100, but not specifically disclosed herein, will be envisioned by a person skilled in the art of making such vending machines after the person has been made privy to the disclosures made herein.

The method 100 begins with a process 120 being performed for facilitating creation of a customer-configured pizza preparation kit order. A process 140 is performed for processing the customer-configured pizza preparation kit order after receiving the customer-configured pizza preparation kit order. After processing the customer-configured pizza preparation kit order, a process 160 is performed for dispensing the customer-configured pizza preparation kit and a process 180 is performed for managing kit components.

The method 100 is described in view of a single kit order for providing clarity and simplicity of the disclosures made herein. It is contemplated herein that some customer-configured pizza preparation kit orders may comprise more than one pizza preparation kit (i.e., multi-kit orders). For such multi-kit orders, the appropriate processes, operations and steps of methods in accordance with embodiments of the disclosures made herein are repeated, as necessary.

Figure 2A:
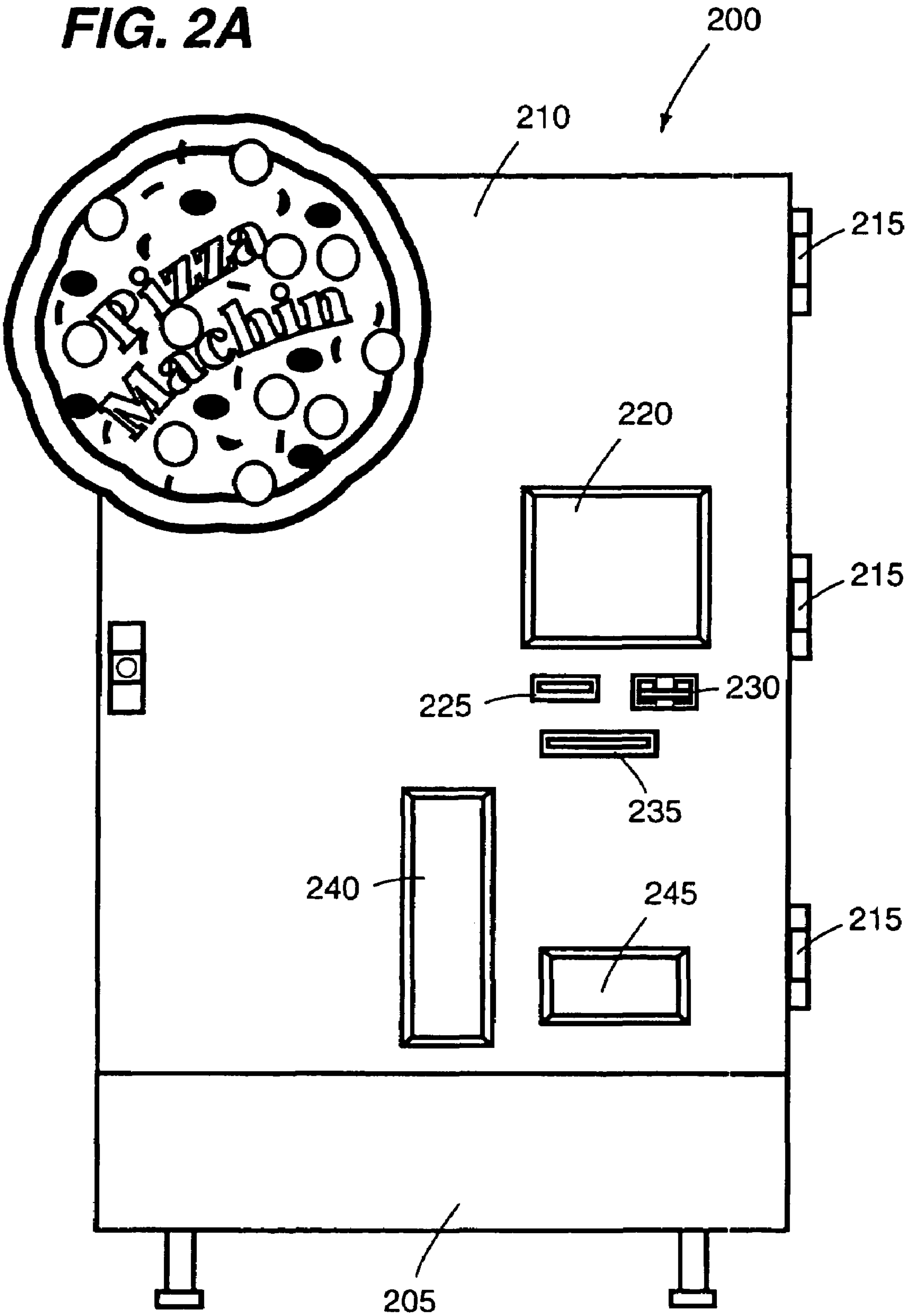
FIGS. 2A through 2C depict an embodiment of a pizza preparation kit vending machine in accordance with an embodiment of the disclosures made herein.
Figure 2B:
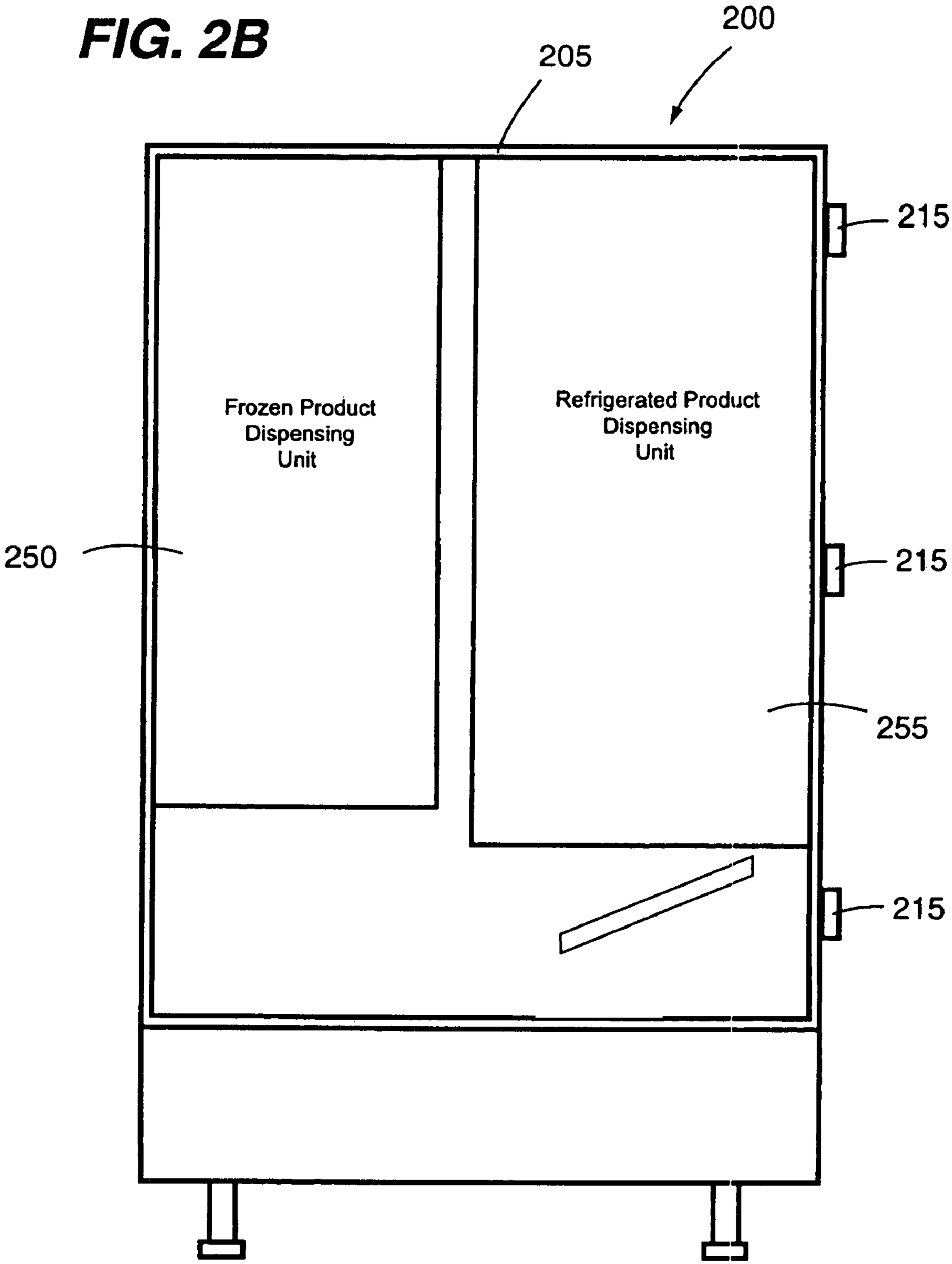
Figure 2C:
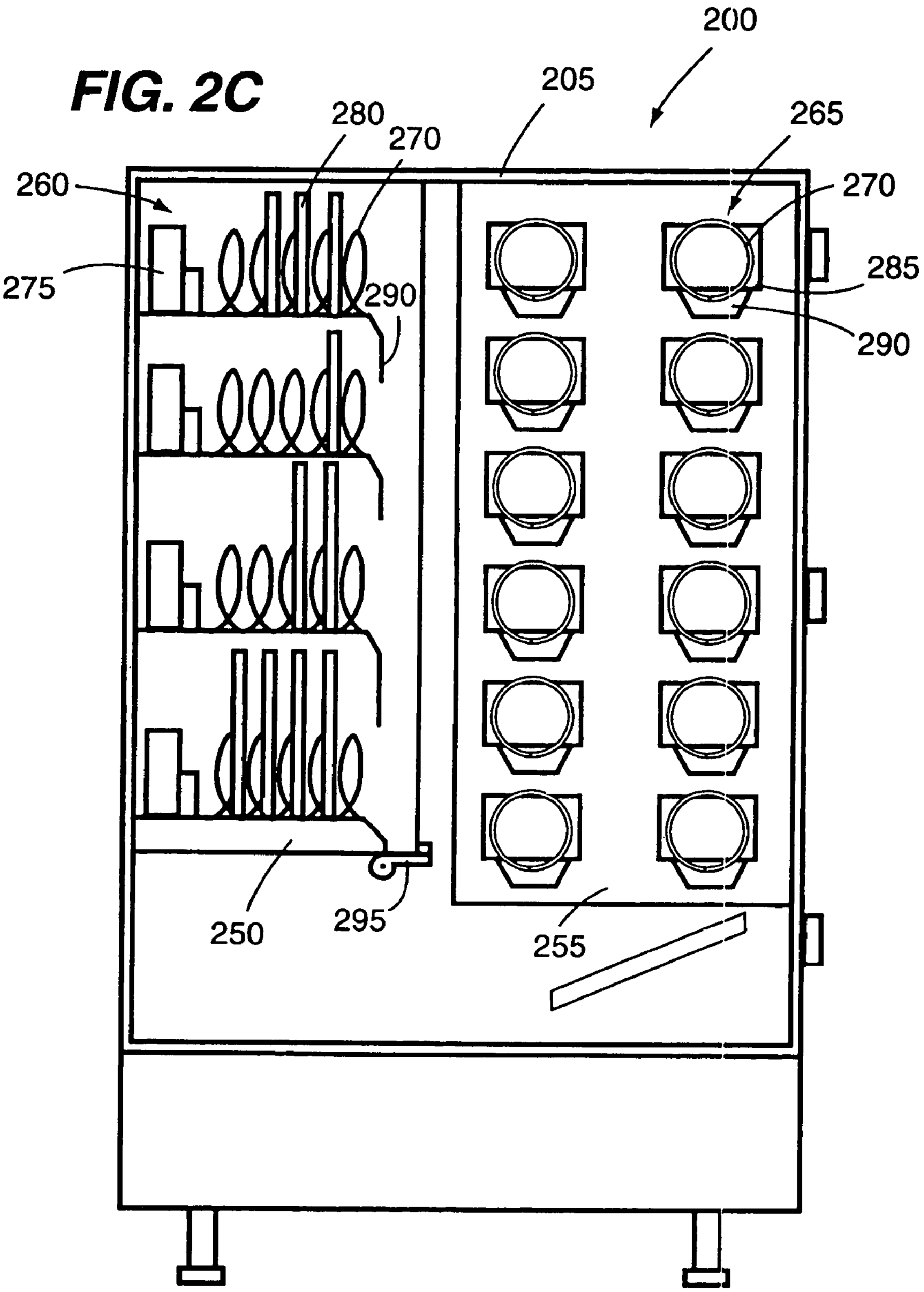

FIGS. 2A through 2C depict an embodiment of a pizza preparation kit vending machine 200 in accordance with an embodiment of the disclosures made herein. The vending machine 200 includes a main body 205 and a door assembly 210. The door assembly 210 is attached to the main body 205 via a plurality of hinges 215, thereby enabling the door assembly 210 to be moved between an open position and a closed position with respect to the main body 205.

The door assembly 210 includes a visual display 220, a cash receptacle 225, a bank card receptacle 230, a printer output chute 235, a crust product access opening 240 and a topping product access opening 245. The visual display 220 is a component of a customer interface (i.e., a user interface) of the pizza preparation kit vending machine 200, enabling visual presentation of vending information. It is contemplated herein that the customer interface may also comprise a speaker for enabling audio presentation of vending information. The cash receptacle 225 and bank card receptacle 230 enable customer access to respective mechanisms configured for allowing cash and bank cards, respectively, to be presented for payment of product offered by the pizza preparation kit vending machine 200. The printer output chute 235 enables a printing mechanism (not shown) to present printed information (e.g., baking instructions, menus, coupons, etc) to customers and prospective customers.

The crust product access opening 240 and the topping product access opening 245 enable access to dispensed pre-packaged crust products and dispensed pre-packaged topping products, respectively. Bare uncooked pizza crust, sauce covered uncooked pizza crust and uncooked pizza crust covered with sauce and cheese (essentially a cheese pizza) are examples of crust products in accordance with embodiments of the disclosures made herein. Cheese, sauce, pepperoni, sausage, vegetables, and other known pizza toppings are examples of topping products in accordance with embodiments of the disclosures made herein. Vacuum-sealed packaging is an example of a packaging arrangement in which crust products and topping products may be pre-packaged.

It is contemplated herein that certain embodiments of pizza preparation kit vending machines in accordance with embodiments of the disclosures made herein will include a single dispensed product access opening. In such pizza preparation kit vending machines, dispensed crust products and topping products are accessible by the customer through the single dispensed product access opening. Such would be the case where a pre-packaged crust product and associated pre-packaged topping product(s) are packaged in a machine-supplied 'carrying article' (e.g., a bag, a box, sleeve, etc) within the pizza preparation kit vending machine. It is contemplated herein that the machine-supplied carrying article may be made from an insulating material or in a manner that provides enhanced insulating properties relative to a base material from which the machine-supplied carrying article is made.

It is contemplated herein that a pizza preparation kit vending machine in accordance with an embodiment of the disclosures made herein may be configured for remote payment applications. An example of a remote payment application is placement of a pizza preparation kit vending machine in a grocery store where pizza preparation kits are paid for at a cash register. In such applications, a pizza preparation kit vending machine as disclosed herein will provide a bar code label (e.g., affixed to a machine-supplied carrying article), which can be scanned at the cash register.

The main body 205 includes a frozen product dispensing unit 250 and a refrigerated product dispensing unit 255. The frozen product dispensing unit 250 facilitates dispensing of frozen product (e.g., frozen crust product, ready-to-bake pizza, ready-to-bake pizza snacks, etc) and the refrigerated product dispensing unit 255 facilitates dispensing of refrigerated product (e.g., refrigerated topping products). In one embodiment of a pizza preparation vending machine as disclosed herein, the frozen product dispensing unit 250 and the refrigerated product dispensing unit 255 each comprise respective refrigeration units. In another embodiment of a pizza preparation vending machine as disclosed herein, the frozen product dispensing unit 250 comprises a refrigeration unit and chilled air (i.e., air below 32-degrees Fahrenheit) is provided from the frozen product dispensing unit 250 to the refrigerated product dispensing unit at a rate and/or volume which maintains contents of the refrigerated product dispensing unit 255 at a temperature at or above 32-degrees Fahrenheit.

As depicted, the frozen product dispensing unit 250 and the refrigerated product dispensing unit 255 are in side-by-side relationship. In other embodiments of the disclosures made herein (not shown), the frozen product dispensing unit 250 and the refrigerated product dispensing unit 255 may be in other physical relationship, such as over-under relationship or front-rear relationship.

The intent of the frozen product dispensing unit 250 and the refrigerated product dispensing unit 255 is to enable some products (e.g., crust products) to be maintained and dispensed in a frozen state and to enable other products (e.g., topping products) to be maintained and dispensed in a non-frozen state. The benefit of enabling some products (e.g., crust products) to be dispensed in a frozen state and other products (e.g., topping products) to be dispensed in a non-frozen state is two-fold. First, freshness of crust products is enhanced when such products are maintained in a frozen state prior to baking.

Second, refrigerated but not frozen topping products may be readily spread onto a pizza crust without any need to wait for them to thaw.

It is contemplated herein that all products dispensed within a pizza preparation kit in accordance with an embodiment of the disclosures made herein may be frozen products. In such embodiments, the refrigerated product dispensing unit 255 is either replaced with a second frozen product dispensing unit or the refrigerated product dispensing unit 255 is omitted entirely (thereby making room to enlarge the frozen product dispensing unit 250).

Referring now specifically to FIG. 2C, the frozen product dispensing unit 250 (shown with a respective front panel omitted) includes a plurality of frozen product dispensers 260 and the refrigerated product dispensing unit 255 (shown with a respective front panel omitted) includes a plurality of refrigerated product dispensers 265. Each one of the frozen product dispensers 260 and each one of the refrigerated product dispensers 265 includes a helical advancing member 270 connected to a drive unit 275 (e.g., a motor).

A plurality of frozen product 280, such as pre-packaged crust product, is stacked on the helical advancing member 270 of each frozen product dispenser 260. A plurality of refrigerated product 285, such as pre-packaged topping product, is stacked on the helical advancing member 270 of each refrigerated product dispenser 265. It is contemplated herein that different crust products (e.g., small-size crust products, large-size crust products, different types of crust products, etc) may be provided on respective ones of the dispensers (260, 265). For example, large-size crust products of a first type (e.g., thin crust with a first type of sauce) may be dispensed from a first one of the plurality of frozen product dispensers 260 and small-size crust products of a second type (e.g., self-rising crust with a second type of sauce) may be dispensed from a second one of the plurality of frozen product dispensers 260.

In response to the drive unit 275 turning the attached helical advance member 270, the respective frozen product 280 or refrigerated product 285 is advanced toward a dispensing end of the respective frozen product dispenser 260 or refrigerated product dispenser 265. When advanced sufficiently, a next available frozen product 280 of a particular one of the frozen food dispensers 260 falls from the frozen product dispenser 260. Similarly, when advanced sufficiently, a next available refrigerated product 285 of a particular one of the refrigerated product dispensers 265 falls. Each one of the frozen product dispensers 260 and each one of the refrigerated product dispensers 265 includes a deflector shroud 290 for reducing the potential for a falling frozen product 280 or refrigerated product 285 from becoming lodged on a lower one of the respective product dispensers (260, 265).

The frozen food product dispensing unit 250 includes a normally closed exit door 295 through which the next available frozen product 280 of a particular oil of the frozen product dispensers 265 falls. The normally closed exit door 295 serves to maintain a closed environment of the frozen product dispensing unit 250. Depending on the arrangement and requirements of the refrigerated product dispensing unit 255, the refrigerated product dispensing unit 255 may include a normally closed exit door through which the next available refrigerated product 285 for a particular one of the refrigerated food dispensers 265 falls.

Although specific details of a pizza preparation kit vending machine are disclosed herein, it should be understood that known vending machine arrangements and techniques not disclosed herein may be substituted for corresponding arrangements and techniques disclosed herein. For example, the helical advance members 270 disclosed herein may be replaced with another known mechanism configured for advancing pre-packaged products in a vending machine. Preferably, the mechanism chosen for advancing pre-packaged products will be configured for enabling a high density of prepackaged products to be held in a pizza preparation kit vending machine as disclosed herein.

Figure 3A:
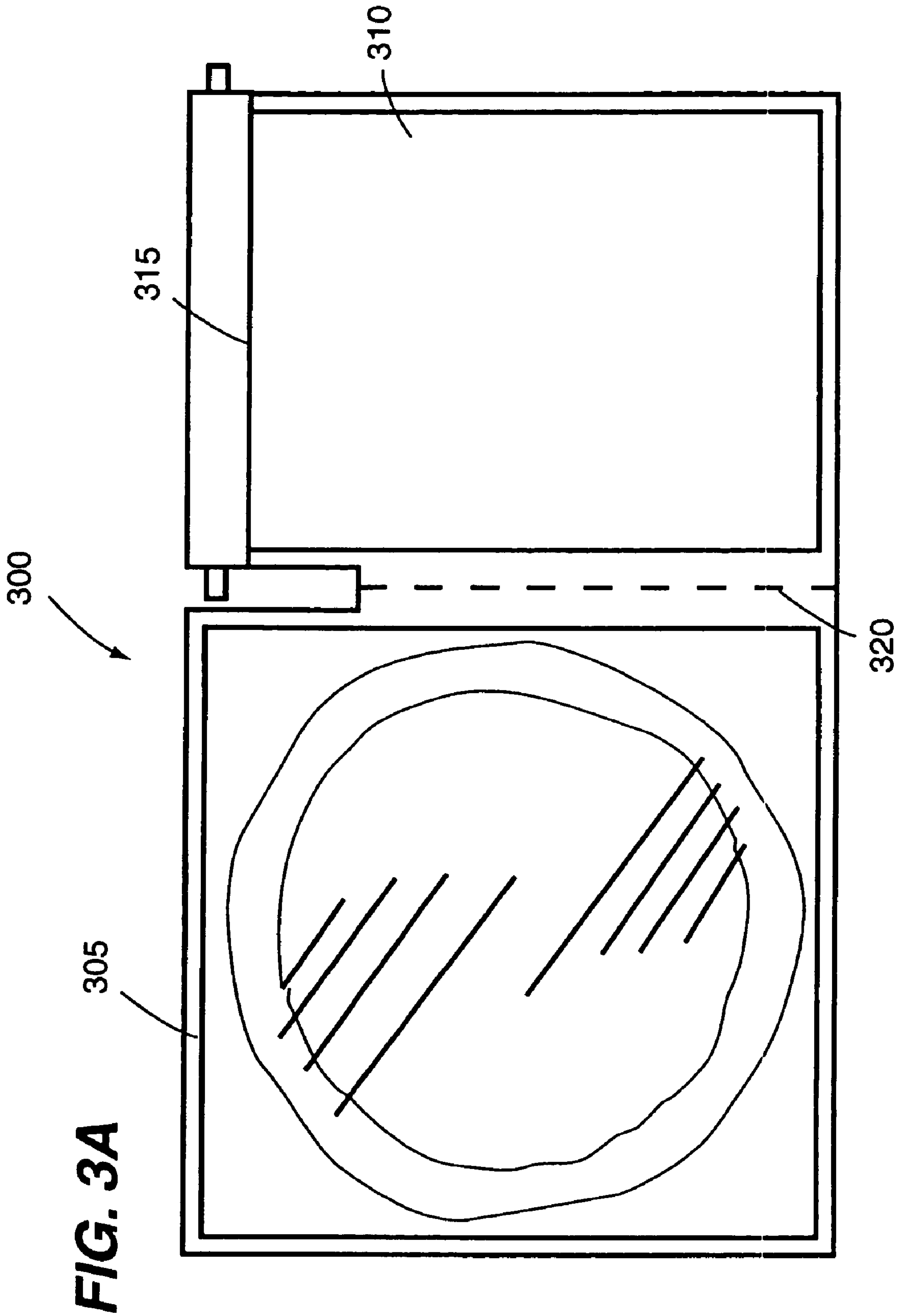
FIGS. 3A through 3C depict various embodiments of a pre-packaged crust product package including a vacuum-sealed portion having a topping product packaging article attached thereto.
Figure 3B:
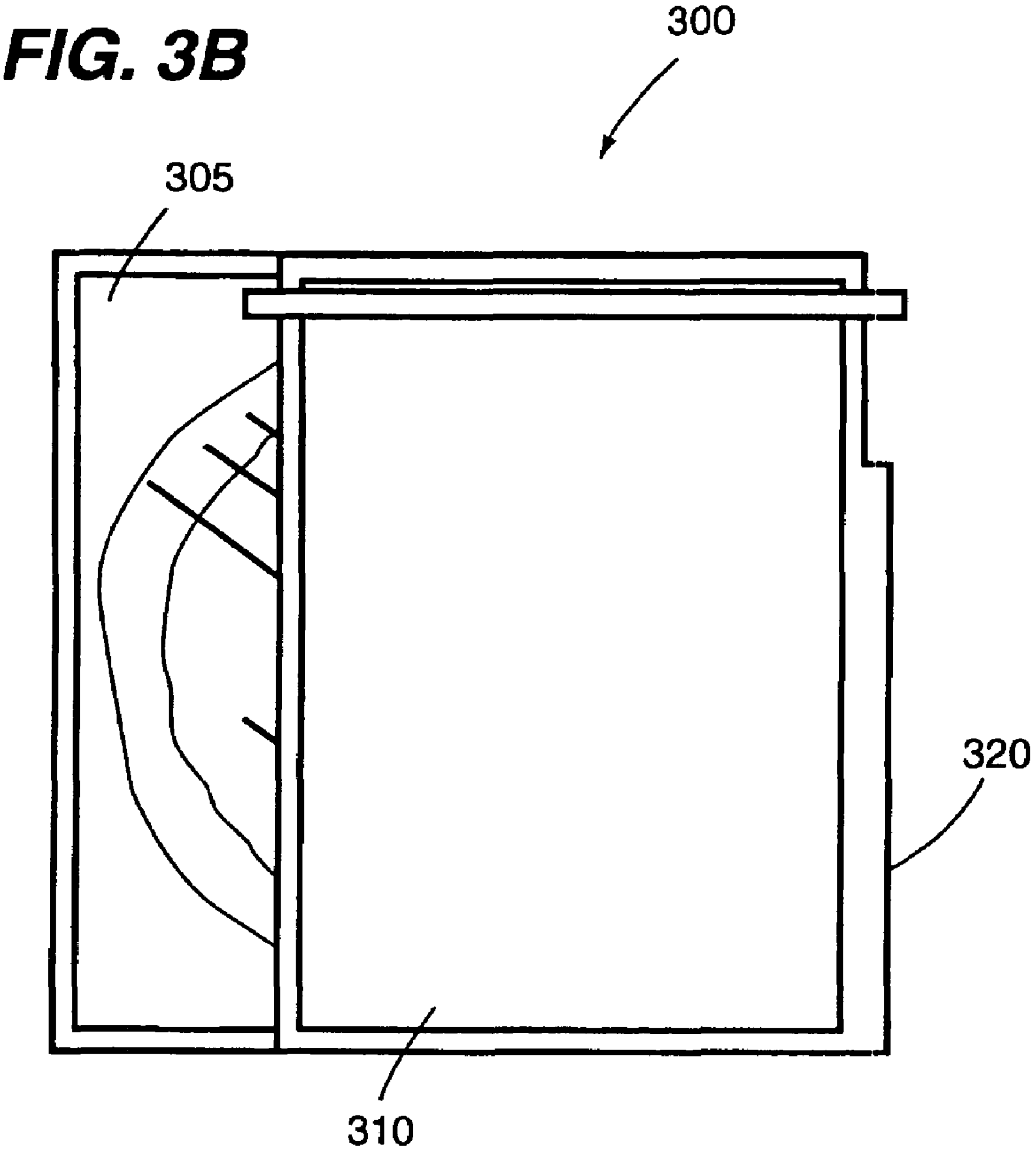
Figure 3C:
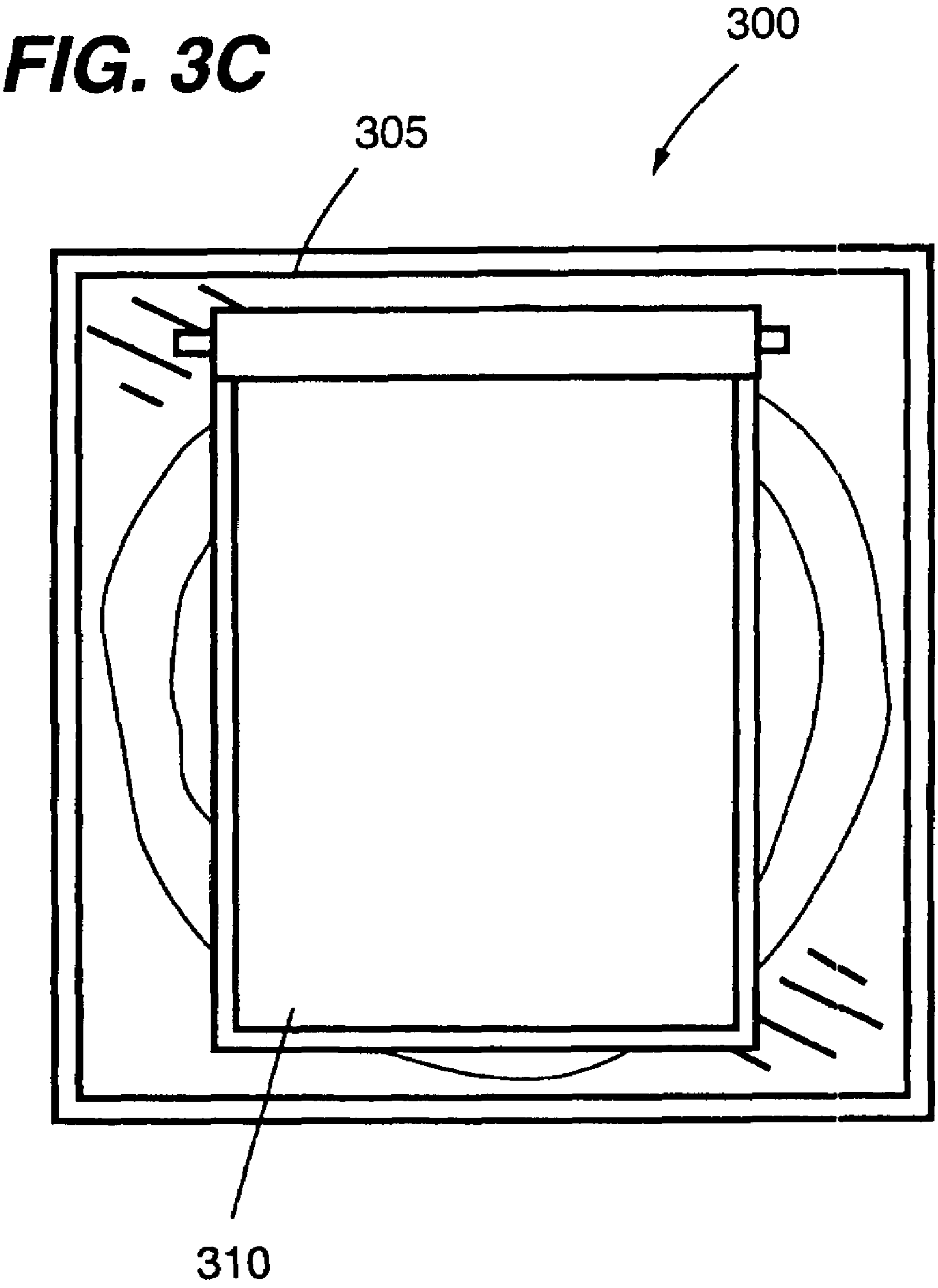

FIGS. 3A through 3C depict various embodiments of a pre-packaged crust product package 300 including a vacuum sealed portion 305 having a topping product packaging article 310 attached thereto. The topping product packaging article 310 includes a cavity therein, an open end 315 and means for enabling the open end 315 to be held in a folded-closed position (e.g., a flap and tie wrap), whereby pre-packaged topping products may be placed within the cavity and the open end 315 may be folded closed. An article resembling a pleated bag or a pouch is an example of the topping product packaging article 310. It is contemplated herein that a zip-lock type closure mechanism may be used in place of the means for enabling the open end 315 to be held in a folded-closed position.

A crust product is sealed within the vacuum-sealed portion 305. The topping product packaging article 310 is intended to provide a means of storing one or more pre-packaged topping products therein during transport of a pizza preparation kit from the point of sale to a customer's destination. Therefore, it will be understood that it is not the intent for bulk, unpackaged topping products to be dispensed into/held in the topping product packaging article 310.

In the embodiment of the pre-packaged crust product package 300 depicted in FIG. 3A, the topping product packaging article 310 is formed integrally with the vacuum-sealed portion 305. A perforation 320 is formed between the vacuum-sealed portion 305 and the topping product packaging article 310 for enabling separation of the vacuum-sealed portion 305 from the topping product packaging article 310. The perforation 320 also enables the topping product packaging article 310 to be folded onto the vacuum sealed portion 305, as depicted in FIG. 3B, thus saving space when the prepackaged crust product is stored in a pizza preparation kit vending machine. In the embodiment of the pre-packaged crust product package 300 depicted in FIG. 3C, the topping product packaging article 310 is a discrete article, which is mounted (e.g., adhesive, heat stacking, etc.) on the vacuum-sealed portion 305 of the pre-packaged crust product package 300.

Figure 4:
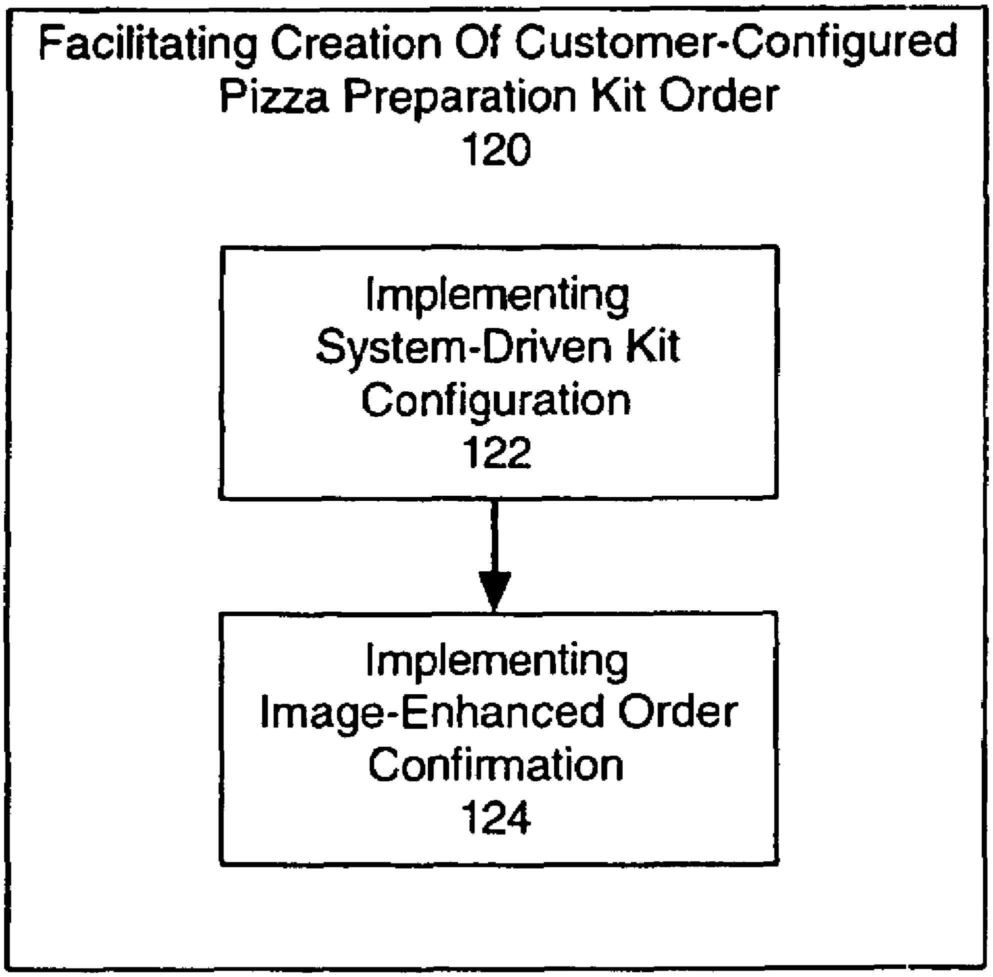
FIG. 4 depicts an embodiment of the process depicted in FIG. 1 for facilitating creation of a customer-configured pizza preparation kit order.

Referring back to FIG. 1, an embodiment of the process 120 for facilitating creation of a customer-configured pizza preparation kit order is depicted in FIG. 4. The process 120 for facilitating creation of the customer-configured pizza preparation kit includes an operation 122 for implementing system-driven kit configuration (e.g., via query-response though a customer interface). After the operation 122 is performed for implementing system-driven kit configuration, an operation 124 is performed for implementing image-enhanced order confirmation. Image-enhanced order confirmation includes displaying a simulated representation of a pizza corresponding to the customer-configured pizza preparation kit in conjunction with a written summary of the order.

Figure 5:
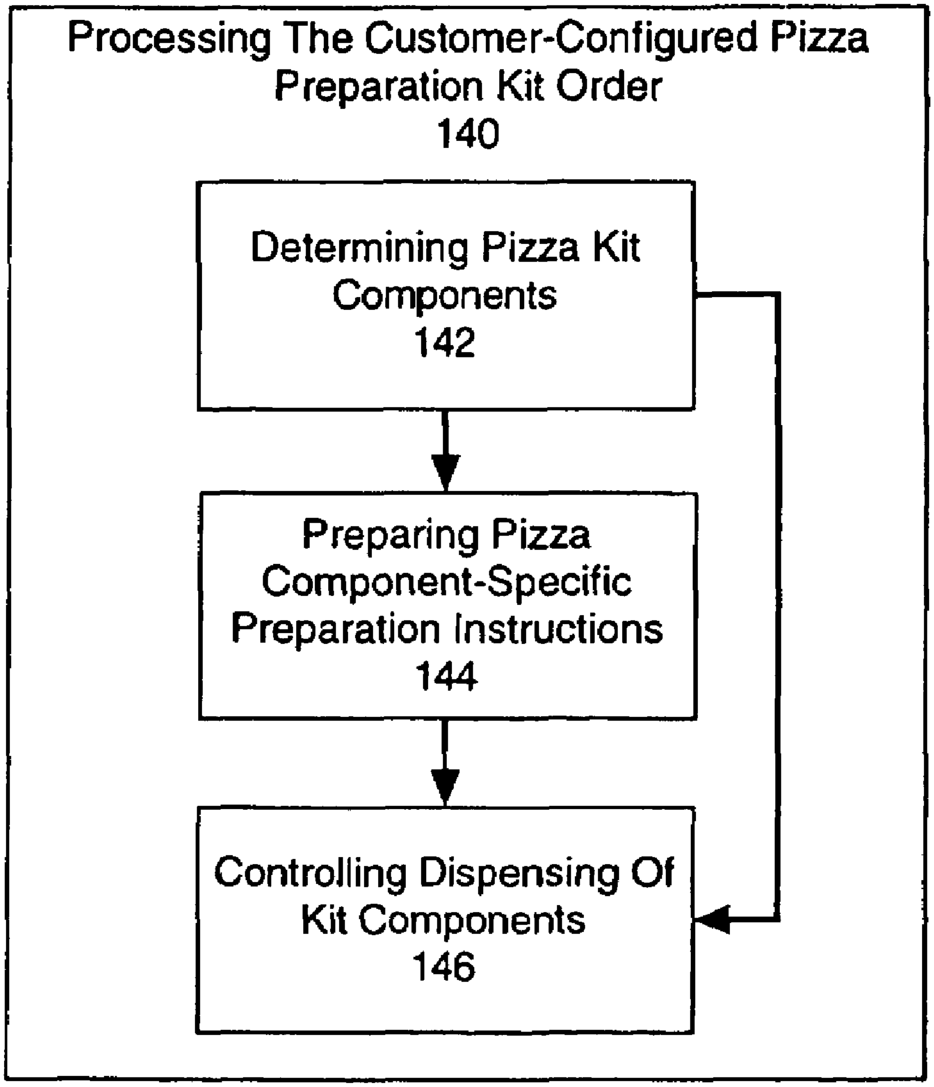
FIG. 5 depicts an embodiment of the process depicted in FIG. 1 for processing the customer-configured pizza preparation kit.

FIG. 5 depicts an embodiment of the process 140 for processing the customer-configured pizza preparation kit order. The process 140 for processing the customer-configured pizza preparation kit order includes an operation 142 for determining pizza components of a customer-configured pizza preparation kit. In response to performing the operation 142 for determining the pizza components, an operation 144 is performed for preparing pizza component-specific preparation instructions, followed by an operation 146 being performed for controlling dispensing of the kit components (e.g., outputting appropriate signals to product dispensing units). Broadly, kit components comprise the pizza components (e.g., a specified pre-packaged crust product and specified pre-packaged topping products) and the pizza component-specific preparation instructions. It is contemplated herein that the term kit components may exclude component-specific preparation instructions.

Figure 6:
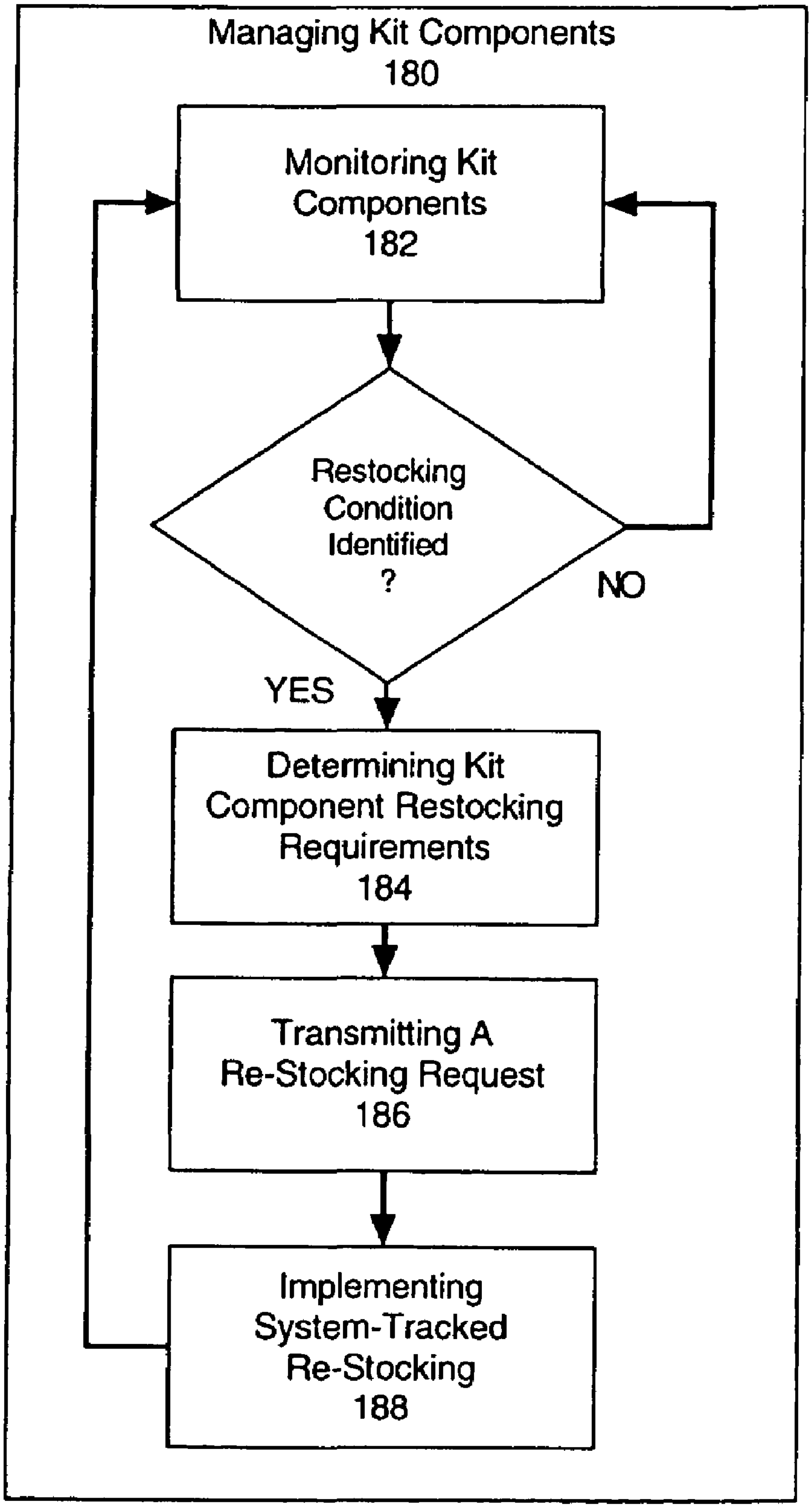
FIG. 6 depicts an embodiment of the process depicted in FIG. 1 for managing kit components.

FIG. 6 depicts an embodiment of the process 180 for managing kit components. The process 180 for managing kit components includes an operation 182 for monitoring kit components. For example, each pizza component (e.g., each pre-packaged crust product and each pre-packaged topping product) has a barcode provided thereon. The barcode designates product information such as product description, packaging date, expiration date, etc. Each barcode is scanned either during loading of the associated product into the pizza preparation kit vending machine (i.e., by the re-stocker) or while stored in the pizza preparation kit vending machine (i.e., by an on-board system operated scanning system). In this manner, the product information obtained from the bar codes enables kit components to be tracked.

In response to monitoring the kit components having determined that no kit components require restocking, the operation 182 for monitoring kit components continues until a restocking condition is identified. It is contemplated that identification of a kit component that has reached an expiration date prior to being dispensed may trigger a restocking condition.

In response to a restocking condition being identified, an operation 184 is performed for determining kit component restocking requirements. Determining a quantity of each item needing to be re-stocked is an example of the operation 184 for determining kit component restocking requirements. It is contemplated herein that information derived from tracking of the number of each pizza component (e.g., each pre-packaged crust product and each pre-packaged topping product) dispensed may also be used for determining the kit component restocking requirements and for performing the operation 182 for monitoring kit components.

After determining the kit component restocking requirements, an operation 186 is performed for transmitting such restocking requirements (e.g., directly by the pizza preparation kit vending machine via a computer network connection or telephone network connection) for reception by a restocking entity. After transmitting the restocking requirements, an operation 188 is performed for implementing system-tracked restocking of the pizza preparation kit vending machine. System tracked restocking includes imparting a data processing module of the pizza preparation kit vending machine with detailed information (e.g., that available from reading a barcode provided on a pizza component) relating to the restocked kit components.

A barcode is one example of a machine-readable device. It is contemplated herein that other forms of machine-readable devices such as transponders configured for transmitting product information (e.g., an RF transponder) may be implemented for enabling management of kit components. It is also contemplated that human-readable devices may also be implemented, in combination with machine-readable devices or separately therefrom, for enabling management of kit components.

Figure 7:
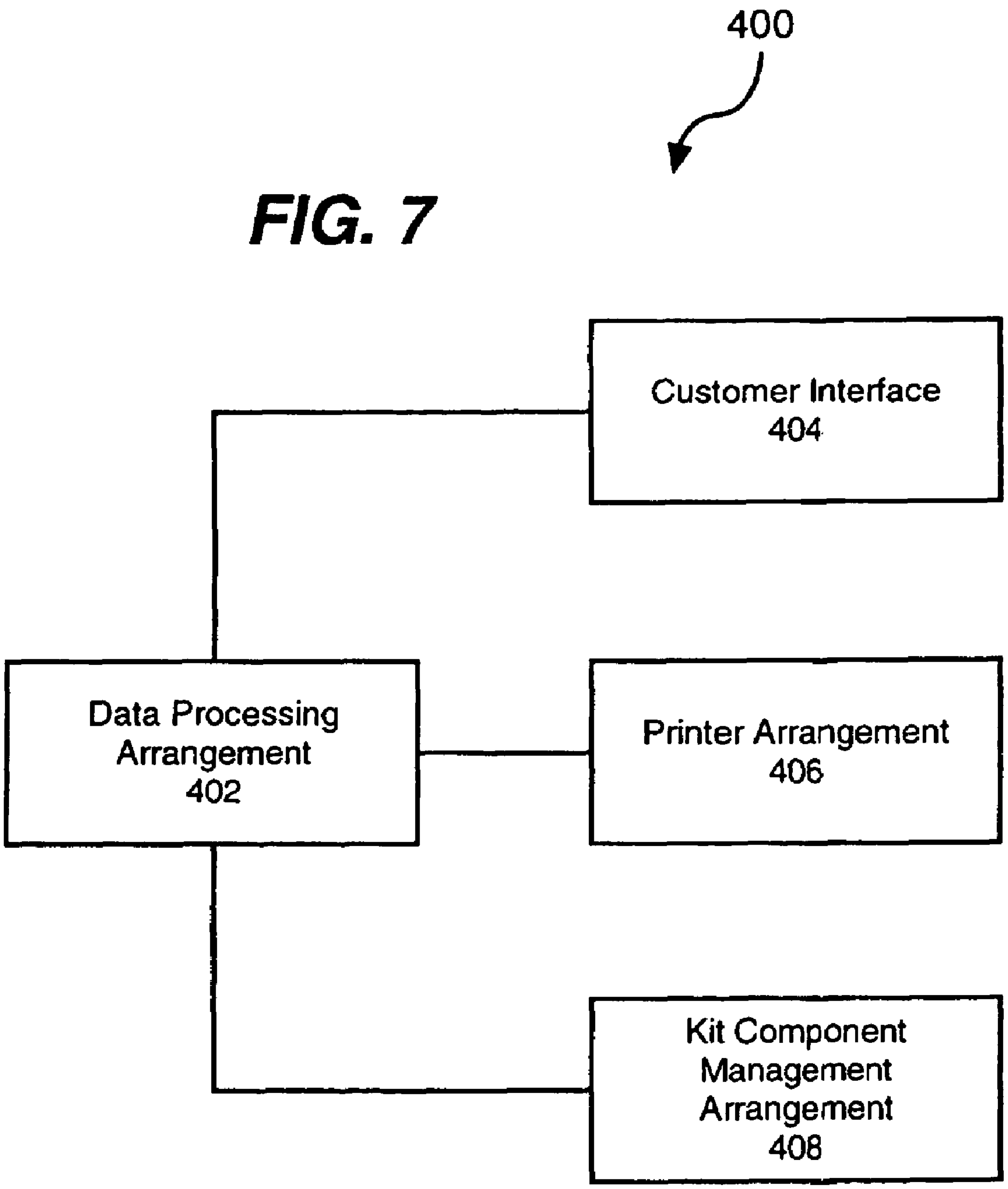
FIG. 7 depicts an embodiment of an apparatus configured for carrying out processes, methods and operations in accordance with embodiments of the disclosures made herein.

An embodiment of an apparatus 400 configured for carrying out the methods, processes and operations disclosed herein is depicted in FIG. 7. The apparatus 400 includes a data processing arrangement 402, a customer interface arrangement 404, a printer arrangement 406 and a kit component management arrangement 408. The customer interface arrangement 404, the printer arrangement 406 and the kit component management arrangement 408 are coupled to the data processing arrangement 402 for enabling associated functionalities to be facilitated jointly and individually between the arrangements (402-408). Each one of the arrangements (402-408) may include hardware elements, firmware elements and/or software elements. Some of the arrangements (402-408) may share certain hardware elements, firmware elements and/or software elements.

In operation of a pizza preparation kit vending machine in accordance with an embodiment of the disclosures made herein, a customer (i.e., a pizza kit purchaser) initiates interaction with the pizza preparation kit vending machine by viewing an introductory visual message presented via a customer interface on a visual display of the pizza preparation kit vending machine. It is contemplated herein that the introductory visual message may be accompanied by an audio message. The customer is presented with an ordering interface via the customer interface. The customer is lead through an ordering process via the customer interface for facilitating creation of a customer-configured pizza preparation kit order. The customer-configured pizza preparation kit order comprises a customer-designated pre-packaged crust product and one or more customer-designated prepackaged topping products. The ordering process may be based on system-provided pizza templates, which a customer customizes by adding and/or subtracting certain toppings.

After creation of the customer-configured pizza preparation kit order is facilitated, the customer is presented with order confirmation information via the customer interface. The order confirmation information includes a summary of the customer-configured pizza preparation kit created by the customer, a kit price corresponding to the customer-configured pizza preparation kit and a means for confirming acceptance of the order (e.g., a confirmation button to press). In response to the customer confirming acceptance of the order, the customer is presented with payment option information via the customer interface. The payment option information includes instructions for directing the customer to insert a specified amount of cash (i.e., equal to the kit price) into a cash receptacle of the pizza preparation kit vending machine or to insert a bank card (e.g., a credit card, charge card, debit card, etc) into a bank card receptacle of the pizza preparation kit vending machine. In the case of inserting a bank card, the kit price will be applied to the customer's bank card (e.g., deducted from, charged to, etc).

After payment is facilitated, the pizza preparation kit vending machine performs necessary operations for dispensing and/or packaging the pre-packaged crust and topping product comprised by the customer-configured pizza preparation kit order. The specific operations and sequence of operations performed by the pizza preparation kit vending machine for dispensing and/or packaging the pre-packaged crust and topping products is dependent upon a specific embodiment of the pizza preparation kit vending machine. In general, the pizza preparation kit vending machine prepares pizza component-specific preparation instructions (i.e., dependent upon the specific products comprised by the customer-configured pizza preparation kit) and then dispenses the prepackaged crust and topping product(s) into a dispensing receptacle of the pizza preparation kit vending machine where the customer can retrieve them. The pizza component-specific preparation instructions and the various pre-packaged products may all be packaged in a machine-supplied 'carrying article' (e.g., a bag, a box, sleeve etc) within the pizza preparation kit vending machine or the user may need to package at least a portion of the various pre-packaged products and the pizza component-specific preparation instructions into the machine-supplied ‘carrying article’.

After dispensing the kit-specific pizza preparation instructions and the various pre-packaged products, the pizza preparation kit vending machine facilitates completion of the order. Completion of the order includes dispensing a receipt (e.g., upon request by the customer.)

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of appended claims.

What is claimed is:

1. A method configured for vending a customer-configured pizza preparation kit from a self-serve vending machine, comprising:

facilitating input of a customer-configured pizza preparation kit order using a user interface portion of the self-serve vending machine;

processing the customer-configured pizza preparation kit order, wherein said processing is performed by an order processing portion of the self-serve vending machine; and dispensing pre-packaged kit components corresponding to the customer-configured pizza preparation kit.

2. The method of claim 1, further comprising:

aggregating said prepackaged kit components in a carrying article thereby creating a customer-configured pizza preparation kit, wherein said aggregating is performed within the self-serve vending machine; and dispensing the customer-configured pizza preparation kit order from within the self-serve vending machine in a manner allowing said user to manually retrieve said prepackaged kit components after performing said aggregating.

3. The method of claim 1 wherein:

determining said prepackaged kit components includes facilitating a system-driven kit configuration process; and the system-driven kit configuration process includes soliciting kit configuration information and receiving response information corresponding to at least a portion of said kit configuration information.

4. The method of claim 1 wherein processing said order includes determining availability of said prepackaged kit components of the customer-configured pizza preparation kit order for being dispensed.

5. The method of claim 4, further comprising:

aggregating said prepackaged kit components in a carrying article thereby creating a customer-configured pizza preparation kit, wherein said aggregating is performed within the self-serve vending machine; and dispensing the customer-configured pizza preparation kit order from within the self-serve vending machine in a manner allowing said user to manually retrieve said prepackaged kit components after performing said aggregating.

6. The method of claim 5 wherein processing said order includes:

determining kit components of said order; and preparing component-specific preparation instructions for said order.

7. The method of claim 1 wherein processing said order includes:

determining kit components of said order; and preparing component-specific preparation instructions for said order.

8. The method of claim 1 wherein processing said order includes preparing component-specific preparation instructions for said order.

9. The method of claim 1 wherein dispensing said prepackaged kit components includes:

dispensing a packaged pizza crust product including a pizza crust having sauce and cheese spread thereon; and dispensing a packaged pizza topping product.

10. The method of claim 9, further comprising:

aggregating said prepackaged kit components in a carrying article thereby creating a customer-configured pizza preparation kit, wherein said aggregating is performed within the self-serve vending machine; and dispensing the customer-configured pizza preparation kit order from within the self-serve vending machine in a manner allowing said user to manually retrieve said prepackaged kit components after performing said aggregating.

11. The method of claim 10 wherein processing said order includes:

determining kit components of said order; and preparing component-specific preparation instructions for said order.

12. A method configured for vending a customer-configured pizza preparation kit from a self-serve vending machine, comprising:

receiving a customer-configured pizza preparation kit order at a user interface portion of the self-serve vending machine;

processing the customer-configured pizza preparation kit order, wherein said processing is performed by an order processing portion of the self-serve vending machine;

preparing a customer-configured pizza preparation kit corresponding to the customer-configured pizza preparation kit order, wherein the customer-configured pizza preparation kit includes a packaged pizza crust product and a packaged pizza topping product, wherein the packaged pizza crust product and the packaged pizza topping product are separately packaged from each other, wherein the packaged pizza crust product and a packaged pizza topping product are aggregated within a carrying article, and wherein said preparing is performed with in the self-serve vending machine; and dispensing the customer-configured pizza preparation kit from within the self-serve vending machine in a manner allowing said user to manually retrieve the packaged pizza crust product and the packaged pizza topping product after performing said preparing.

13. The method of claim 12 wherein preparing the customer-configured pizza preparation kit includes:

dispensing the packaged pizza crust product; and dispensing the packaged pizza topping product.

14. The method of claim 13 wherein:

dispensing the packaged pizza crust product includes outputting a respective signal for causing activation of a first product dispenser; and dispensing the packaged pizza topping product includes outputting a respective signal for causing activation of a second product dispenser.

15. The method of claim 14 wherein processing said order includes:

determining kit components of the customer-configured pizza preparation kit order; and determining availability of said prepackaged kit components of the customer-configured pizza preparation kit order for being dispensed.

16. The method of claim 12 wherein processing said order includes determining availability of said prepackaged kit components of the customer-configured pizza preparation kit order.

17. A self-serve vending machine, comprising:

means for receiving a customer-configured pizza preparation kit order at a user interface portion of the self-serve vending machine;

means for processing the customer-configured pizza preparation kit order, wherein said processing is performed by an order processing portion of the self-serve vending machine;

means for preparing a customer-configured pizza preparation kit corresponding to the customer-configured pizza preparation kit order, wherein the customer-configured pizza preparation kit includes a packaged pizza crust product and a packaged pizza topping, wherein the packaged pizza crust product and the packaged pizza topping product are separately packaged from each other, wherein the packaged pizza crust product and a packaged pizza topping product are aggregated within a carrying article, and wherein said preparing is performed with in the self-serve vending machine; and means for dispensing the customer-configured pizza preparation kit from within the self-serve vending machine in a manner allowing said user to manually retrieve the packaged pizza crust product and the packaged pizza topping product after performing said preparing.

18. The machine of claim 17 wherein said means for preparing the customer-configured pizza preparation kit includes:

means for dispensing the packaged pizza crust product; and means for dispensing the packaged pizza topping product.

19. The machine of claim 18 wherein:

said means for dispensing the packaged pizza crust product includes means for outputting a respective signal for causing activation of a first product dispenser; and said means for dispensing the packaged pizza topping product includes means for outputting a respective signal for causing activation of a second product dispenser.

20. The machine of claim 19 wherein said processing said order includes:

means for determining prepackaged kit components of the customer-configured pizza preparation kit order; and means for determining availability of said prepackaged kit components of the customer-configured pizza preparation kit order for being dispensed.

* * * * *